United States Patent [19]

Frazier

[11] 4,358,674

[45] Nov. 9, 1982

[54] STEERED LOW COST AUTO FOCUS SYSTEM

[75] Inventor: James H. Frazier, Aurora, Colo.

[73] Assignee: Honeywell, Inc., Minneapolis, Minn.

[21] Appl. No.: 212,930

[22] Filed: Dec. 4, 1980

[51] Int. Cl.³ .............................................. G01J 1/36
[52] U.S. Cl. ...................................... 250/204; 354/25
[58] Field of Search ........... 250/201, 204, 209, 214 R; 354/25, 31; 356/1, 4

[56] References Cited

U.S. PATENT DOCUMENTS

| | | | |
|---|---|---|---|
| 4,103,152 | 7/1978 | Stauffer | 250/201 |
| 4,309,603 | 1/1982 | Stauffer | 250/204 |
| 4,331,864 | 5/1982 | Nakajima et al. | 354/25 |

Primary Examiner—David C. Nelms
Attorney, Agent, or Firm—Charles J. Ungemach

[57] ABSTRACT

Range finding equipment for use with optical systems utilizing a small number of radiation detectors positioned to receive radiation in first and second patterns from a remote object. The logarithm of the ratio of the output of a first and second detector are compared with the logarithm of the ratio of the output of a third and fourth detector to determine which has the largest absolute magnitude. The system operates to control the range finding circuitry with the largest signal thus obtained.

12 Claims, 2 Drawing Figures

STEERED LOW COST AUTO FOCUS SYSTEM

BACKGROUND OF THE INVENTION

In a copending application of Norman L. Stauffer, Ser. No. 85,821, filed Oct. 17, 1979, now U.S. Pat. No. 4,309,603 a low cost auto focus system is disclosed in which as few as two radiation responsive detector pairs are utilized thus avoiding the necessity for a large and costly detector array that had been common in the prior art at that time. The purpose for this system was to provide an auto focus arrangement for less expensive cameras while still retaining most of the advantages obtained in the prior art. The system utilized the equation $V = |\log a_1/b_2| - |\log a_2/b_1|$ where V is the resultant output and $a_1$, $b_1$, $a_2$ and $b_2$ are the respective outputs of the two pairs of detectors used. This equation operated to produce a summation curve that was normally positive on one side of the proper focus position and negative on the other side of the proper focus position with the zero crossover point representing the position of best focus.

In a copending application of Dennis J. Wilwerding, Ser. No. 99,235, filed Nov. 30, 1979, now U.S. Pat. No. 4,250,377 an improvement on the basic low cost auto focus system was disclosed in which a bias signal was introduced to change the position of the output signal by an amount necessary to prevent improper zero crossover situations that could occur under very low contrast conditions.

One difficulty has been encountered in the operation of the above-described inventions and that lies in the fact that the signals $\log a_1/b_2$ and $\log a_2/b_1$ may individually be quite large even near the zero crossover point representing the best focus position. Because of this, the difference amplifiers utilized with respect to the two detector pairs had to be extremely closely matched so that the difference between the absolute values of the log functions, represented by the above equation, can be zero at the proper position. It has been found that providing such closely matched amplifiers is a serious problem in the production of the low cost circuit and accordingly, schemes have been devised in an attempt to utilize amplifiers that are not necessarily exactly matched. One such scheme was a suggestion to utilize the equation $|\log a_1/b_1| + |\log a_2/b_2|$ and instead of detecting the zero crossover point, determining the point at which the curve generated by this equation peaks. Such a circuit would avoid the necessity for closely matched amplifiers but introduces the problem of difficulty of peak detection. Most hand-held cameras cannot be absolutely rigidly positioned during the determination of range and slight motions introduced by the operator cause small peaks to exist along the output curve. When this occurs, most peak detection circuits are unable to determine the difference between a small spurious peak and the actual peak representing best focus. Also, peak detection is expensive to implement with integrated circuit technology because it generally requires a large capacitor. The capacitor requires a lot of chip area or an external component.

SUMMARY OF THE INVENTION

The apparatus of the present invention operates to examine the signal $\log a_1/b_1$ and $\log a_2/b_2$ to determine which of them has the greater slope and then operates to use only the larger signal to plot a zero crossover point from the expression $V = \log a_1/b_1$ or $V = \log a_2/b_2$. By utilizing the largest slope, it is possible to obtain a zero crossover point which is closer to the actual focus position than a smaller signal and does not involve the use of peak detection circuitry.

DETAILED DESCRIPTION OF THE PREFERRED EMBODIMENT

Figure 1:
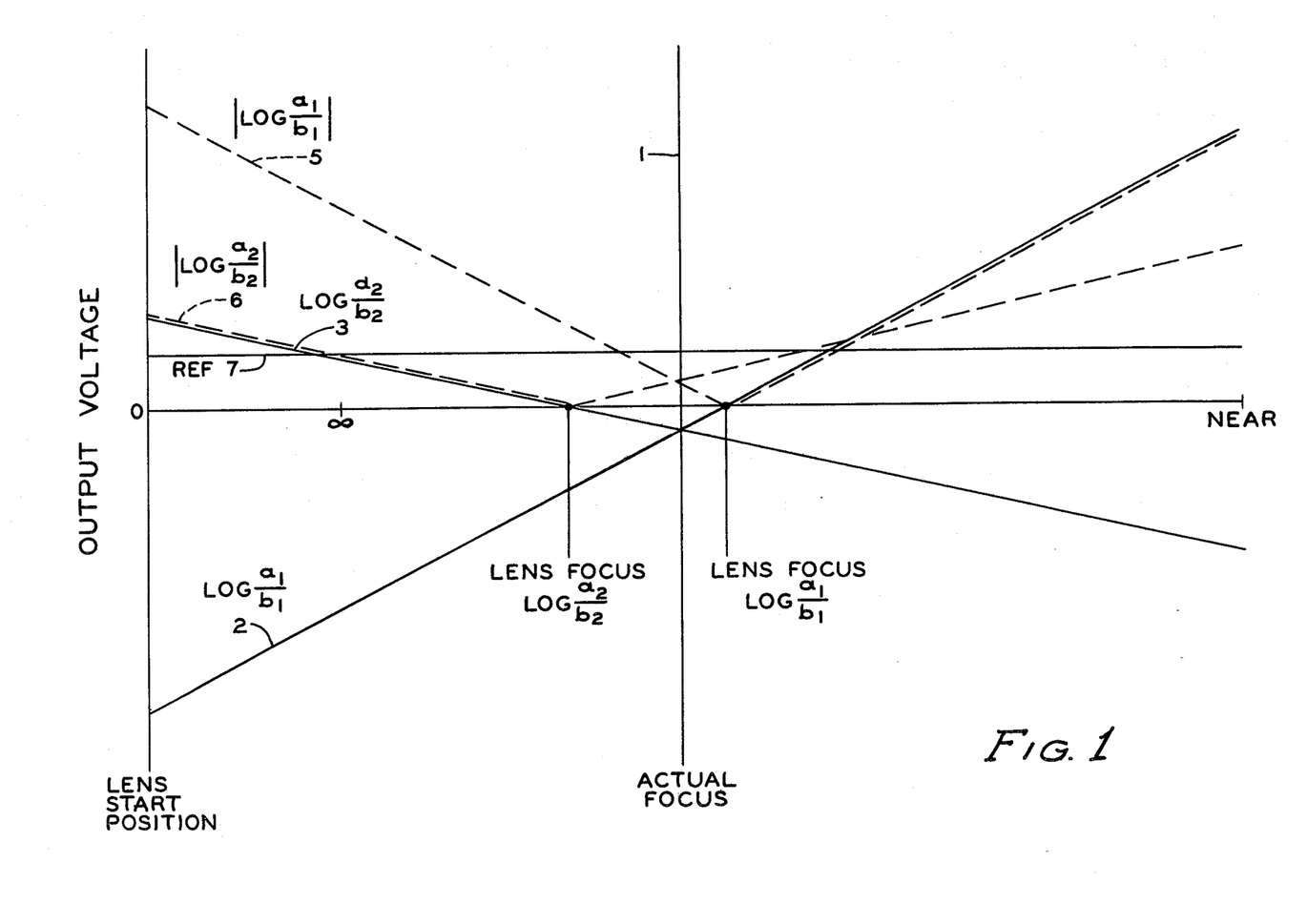
FIG. 1 shows a graph of the various input signals involved in the present invention.

In FIG. 1, the output values of various signals are plotted as a function of lens extension from a lens start position beyond infinity on the left to "near" on the right. A vertical line 1 represents an assumed actual best focus position. A solid line 2, representing an assumed value for $\log a_1/b_1$ is shown extending from a negative value on the left through zero near the actual best focus line 1 to a positive value on the right. This curve, as with other curves shown in FIG. 1, is shown as a straight line for convenience but in actual practice, may be somewhat curved. A solid line 3, representing an assumed value for $\log a_2/b_2$, is shown extending from a positive value on the left through a zero crossover point also near the actual best focus line 1 to a negative value on the right. If everything were perfectly matched, the two zero crossover points for curves 2 and 3 would coincide at the actual best focus line 1 but because of mismatch of components, they will normally not do so. While line 2 has been shown starting negative on the left and line 3 is shown starting positive on the left, both could be on the same side of zero or opposite to the way they are shown. It should be noted that the line with the greatest slope, line 2, reaches the zero crossover point closer to the actual best focus line 1 than does line 3. Since the focus error is in volts, the greater the slope, the more closely the zero crossover point will be to the actual best focus point.

A dashed line curve 5 is shown in FIG. 1 representing the absolute value of $\log a_1/b_1$ and a dashed line 6 is shown in FIG. 1 representing the absolute value of $\log a_2/b_2$. From the absolute value curves 5 and 6, it is clear that the curve with the largest slope is curve 5 and in the circuitry to be described, apparatus will be provided for comparing the magnitude of the absolute value of $\log a_1/b_1$ to the absolute value of $\log a_2/b_2$ to determine which of them is the largest at the starting point on the left. The circuitry will then operate to select the largest value and utilize either $\log a_1/b_1$ or $\log a_2/b_2$ for determining the zero crossover point.

A reference voltage, shown as solid line 7, is shown in FIG. 1 and represents the value below at the lens start position where the output slope is too small and thus there is too little contrast to actually determine best focus. The circuitry of the present invention includes apparatus which is the subject of a copending application Ser. No. 213,437, filed Dec. 5, 1980, and which determines whether there is sufficient contrast by taking the absolute value of the signals $\log a_1/b_1$ and $\log a_2/b_2$ near the lens start position and comparing them with the reference voltage. If both of the absolute value signals are below the reference voltage, the system will operate to position the camera lens at the infinity or preferably the hyperfocal position. In FIG. 1, both lines 5 and 6 are shown to be above the reference voltage on the left side of the figure and thus satisfactory contrast is deemed to exist. It should be noted that by allowing the focus lens to start at the position where it would focus on an object further than infinity, as is described in the above-mentioned copending application Ser. No. 213,437, there is some movement of the focus lens before the infinity position is reached. This allows the contrast measurement to be made with greater accuracy before reaching the infinity or hyperfocal position so that with too little contrast, the lens may be properly stopped.

Figure 2:
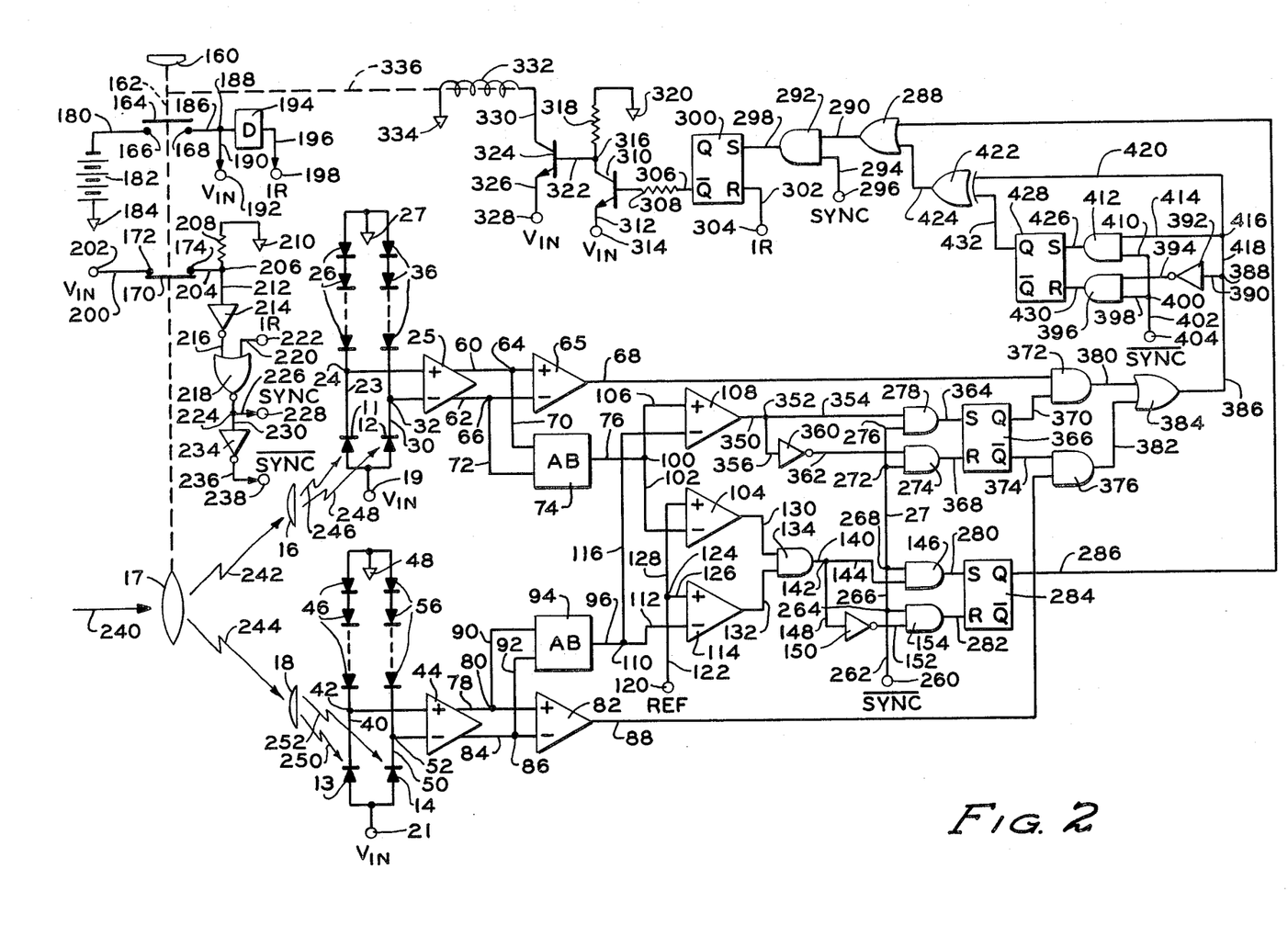
FIG. 2 shows a schematic diagram of one preferred embodiment of the present invention.

Turning now to FIG. 2, four radiation responsive detectors 11, 12, 13 and 14 are shown and correspond to the detectors $a_1$, $b_1$, $a_2$ and $b_2$ of the above-mentioned copending application Ser. No. 85,821. Detectors 11 and 12 are mounted behind a first lenslet 16 and receive radiation from a remote object through a moveable focus lens 17 which may be mechanically connected to the camera taking lens as shown in the above-referred to copending application Ser. No. 85,821 or, lens 17 may itself be the taking lens of the camera. The image seen by detectors 11 and 12 is that of the exit pupil of focus lens 17 and if such focus lens is at the proper focus position, the amount of radiation received by detector 11 will substantially equal the amount of radiation seen by detector 12. In like manner, detectors 13 and 14 are mounted behind a second lenslet 18 and receive radiation from the remote object through the focus lens 17. The images seen by detectors 13 and 14 are also of the exit pupil of the focus lens 17 and when such lens is in a proper focus position, the amount of radiation received by detector 13 will substantially equal the amount of radiation seen by detector 14. When the focus lens 17 is not in the proper focus position, the amount of radiation seen by the detectors will normally differ and that seen by detector 11 will not be equal to that seen by detector 12 nor will that seen by detector 13 be equal to that seen by detector 14. By analyzing the outputs of the four detectors, a signal may be generated which causes the focus lens to be moved to the proper focus position.

In FIG. 2, one side of detectors 11 and 12 are connected together and to a source of negative potential 19, identified as $V_{in}$. In like manner, one side of detectors 13 and 14 are connected together to a source of negative potential 21 also identified as $V_{in}$. The other side of detector 11 is connected by a conductor 23 to a junction point 24 which is connected to the positive input of a first differential amplifier 25. A plurality of logging diodes 26 are connected in series between a ground connection 27 and junction point 24. The purpose of logging diodes 26 is to create a signal at junction point 24 and thus to the input of amplifier 25 representative of the log of the output of detector 11, that is, log $a_1$. The other side of detector 12 is connected by a conductor 30 to a junction point 32 which is connected to the negative input terminal of amplifier 25. A second plurality of logging diodes 36 are connected between the ground connection 27 and the junction point 32. The purpose of logging diodes 36 is to create a signal at junction point 32 and the negative input of amplifier 25 indicative of the logarithm of the signal from detector 12, that is, log $b_1$. In similar fashion, the other side of detector 13 is connected by a conductor 40 to a junction point 42 which is also connected to the positive input of a second differential amplifier 44. A plurality of logging diodes 46 is shown connected between a ground connection 48 and junction point 42. The purpose of logging diodes 46 is to produce at junction point 42 and the positive input of amplifier 44 a signal representative of the logarithm of the magnitude of the output of detector 13, that is, log $a_2$. The other side of detector 14 is connected by a conductor 50 to a junction point 52 which is connected to the negative input terminal of amplifier 44. Another plurality of logging diodes 56 is shown connected between the ground connection 48 and junction point 52. The purpose of logging diodes 56 is to produce at junction point 52 and the negative input to amplifier 44 a signal which varies with the magnitude of the logarithm of the output of detector 14, that is, the log $b_2$. In actual practice, a bias circuit is preferably connected between detectors 11, 12, 13 and 14 and junction points 24, 32, 42 and 52 to assure a zero voltage drop across the detectors.

Amplifier 25 has a first output 60 which is indicated as positive and a second output 62 which is indicated as negative. The signal between outputs 60 and 62 is representative of the difference between the inputs, that is, the difference between log $a_1$ and log $b_1$ or in other words, is indicative of log $a_1/b_1$. The positive output 60 of differential amplifier 25 is connected to a junction point 64 and to the positive input terminal of a comparator 65. Similarly, the negative output terminal of differential amplifier 25 is connected to a junction point 66 and to the negative input terminal of comparator 65. The output of comparator 65 will generally be like the curve 2 in FIG. 1 and will have initially either a positive or negative value depending upon whether or not the value of $a_1$ exceeds the value of $b_1$ and will move towards the zero axis crossing over zero at the point when lens 17 reaches the proper focal position. Accordingly, the signal on conductor 68 can be considered as high or being a "1" whenever it is on the positive side of the zero axis of FIG. 1 and considered as low or being "0" whenever it is on the negative side of the zero axis.

Junction points 64 and 66 are connected by conductors 70 and 72 respectively to the input of an absolute value circuit 74 having an output on a conductor 76. The signal on conductor 76 will be representative of $|\log a_1/b_1|$.

In similar fashion, amplifier 44 has a positive output 78 connected to a junction point 80 and to the positive input of a comparator 82 and has a negative output 84 connected to a junction point 86 and to the negative input terminal of comparator 82. The output of comparator 82 appears on a conductor 88 and the signal on conductor 88 will be similar to that shown as curve 3 in FIG. 1, that is, having either a positive or negative value and moving to cross the zero axis when the lens 17 approaches the proper focus position. The signal on conductor 88 may be considered as high or a "1" whenever its value is positive with respect to the zero axis and may be considered as low or a "0" whenever its value is negative with respect to the zero axis.

Junction points 80 and 86 are connected by conductors 90 and 92 respectively to the input of a second absolute value circuit 94 having an output on a conductor 96. The signal on conductor 96 will be representative of $|\log a_2/b_2|$.

The output of absolute value circuit 74 on conductor 76 is connected to a junction point 100 and from junction point 100 by a conductor 102 to the negative input terminal of a comparator 104. Junction point 100 is also connected by a conductor 106 to the positive input terminal of a comparator 108. The output of absolute value circuit 94 on conductor 96 is connected to a junction point 110 and by a conductor 112 to a negative input terminal of a comparator 114. Junction point 110 is also connected by a conductor 116 to the negative input terminal of comparator 108. A source of reference voltage 120 is shown connected by a conductor 122 to a junction point 124 which is connected by a conductor 126 to the positive input terminal of comparator 114 and by a conductor 128 to the positive input terminal of comparator 104. The magnitude of the reference voltage 120 is chosen so as to provide adequate scene contrast for the scene being viewed by focus lens 17. More particularly, the magnitude of the reference voltage 120 is that shown as line 7 in FIG. 1 and comparators 104 and 114 will compare the absolute values of the signals on outputs 76 and 96 with the reference voltage so that if both of them are below the reference voltage, a default signal will occur as hereinafter explained. The output of comparator 104 appears on a conductor 130 and the output of comparator 114 appears on a conductor 132. Conductors 130 and 132 are presented to the inputs of an AND gate 134. If the magnitude of the reference voltage exceeds the magnitude of the output of absolute value circuit 74, representative of $|\log a_1/b_1|$, then the output of comparator 104 will be a "1", but if the output of the absolute value circuit 74 is greater than that of the reference voltage 120, then the output of comparator 104 will be a "0". In similar fashion, if the magnitude of the reference voltage 120 exceeds the magnitude of the output of absolute value circuit 94, representative of $|\log a_2/b_2|$, then the output of comparator 114 will be a "1", but if the output of the absolute value circuit 94 exceeds that of the reference voltage 120, the output of comparator 114 will be a "0". AND gate 134 operates upon the receipt of two "1" signals from comparators 104 and 114 to produce a "1" signal at its output 140 connected to junction point 142. In any other circumstance; i.e., when either one or both of the signals on conductors 130 and 132 from the outputs of comparators 104 and 114 are "0", then the output of AND gate 134 on conductor 100 and junction point 142 will be a "0". Junction point 142 is connected by a conductor 144 to the lower input terminal of an AND gate 146 and by a conductor 148 to the input of an inverter 150, the output of which appears on a conductor 152 connected to the lower input terminal of an AND gate 154. It is apparent that whenever a "1" signal appears at the output of AND gate 134, the lower input terminal of AND gate 146 will receive a "1" while the lower input terminal of AND gate 154 will receive a "0" by virtue of the inverter 150.

Turning now briefly to the upper left hand portion of FIG. 2, an operator's button 160 is shown having a mechanical connection shown as dashed line 162. The mechanical connection 162 is connected to a first switch arm 164 which operates between two terminals 166 and 168 and to a second switch arm 170 which operates between two terminals 172 and 174. Operator's button 160 is depressed by the photographer on the initiation of a picture taking sequence and the mechanical connection 162 is so arranged that switch arm 164 will close the circuit between terminals 166 and 168 prior to time switch arm 170 will open the circuit between terminals 172 and 174. Terminal 166 is connected by a conductor 180 to the negative terminal of a battery 182, the positive terminal of which is connected to ground at 184. Terminal 168 is connected by a conductor 186 to a junction point 188 which junction point is connected by a conductor 190 to an output terminal 192 identified as $V_{in}$. Junction point 188 is also connected through a delay box, identified by reference numeral 194 having an output on a conductor 196 connected to an initial "reset" output terminal 198 identified as IR. It is seen that upon depression of operator's button 160, switch arm 164 will close the circuit between battery 182 and junction point 188. This supplies a negative voltage to the system components by way of conductor 190 and terminal 192, $V_{in}$. Delay device 194 operates to prevent negative signal from initially being applied to conductor 196 and, instead, IR terminal 198 will be positive for a three to six millisecond period in order to "reset" components, as will be described, and to allow time for the components in the circuitry using the $V_{in}$ voltage to become operative. After the three to six millisecond delay, the negative signal from battery 182 will pass through delay box 194 and a negative signal will appear on conductor 196 and IR terminal 198 for the use by the circuitry as hereinafter explained.

Terminal 172 is connected by a conductor 200 to an input terminal 202 indicated as having a $V_{in}$ input. Terminal 174 is connected by a conductor 204 to a junction point 206 and junction point 206 is connected through a resistor 208 to a ground connection 210. Because the ground connection is at a higher voltage than the $V_{in}$ voltage, ground will be considered as positive and where used in the circuitry, will be considered as producing a "1" whereas $V_{in}$ will be considered as negative and where used in the circuit will be considered as producing a "0" signal. Junction point 206 is connected by a conductor 212 to an inverter 214 having an output on a conductor 216 connected to a NOR gate 218. The other input of NOR gate 218 is connected by a conductor 220 to an input 222 indicated as being an IR input. The output of NOR gate 218 is connected to a junction point 224 which is connected by a conductor 226 to a SYNC output terminal 228 indicated as a "SYNC". The SYNC signal at terminal 228 will be used in the circuitry to be hereinafter described. Junction point 224 is also connected by a conductor 230 to an inverter 234 having an output 236 connected to a NOT SYNC output terminal 238 identified as "$\overline{SYNC}$". The NOT SYNC signal will always be opposite to the SYNC signal and will also be used in the circuitry to be hereinafter described. It is seen that prior to the opening of switch contact 170, a "0" signal is presented from the terminal 202 through switch contacts 172 and 174 to the input of inverter 214 whose output therefore becomes a "1". It is also seen that prior to the three to six millisecond delay, the signal on the IR terminal 222 will be a "1" and this signal will be presented as the other input to NOR gate 218. Therefore, prior to the three to six millisecond delay, NOR gate 218 receives two "1" signals and thus produces a "0" output to junction point 224 and thus to the SYNC terminal 228. It is also seen that the output of inverter 234 will, at this time, be a "1" at the NOT SYNC terminal 238. After the three to six millisecond delay produced by delay box 194, the IR input will become a "0" at which time NOR gate 218 will have a "0" and a "1" as inputs. The output of NOR gate 218 will, however, remain unchanged at a "0" so that the SYNC signal will be a "0" and the NOT SYNC signal will be a "1" at all times prior to the opening of switch contact 170. It is also seen that after opening switch contact 170, the "0" signal from terminal 202 is interrupted and a "1" signal is presented from ground terminal 210 through resistor 208 to junction point 206. This "1" signal is presented to inverter 214 so that its output changes to a "0" and NOR gate 218 receives two "0" input signals. At this time, the output of NOR gate 218 changes to a "1" so that junction point 224 and the SYNC signal at terminal 228 becomes a "1" and by virtue of inverter 234 the NOT SYNC signal appearing at terminal 238 becomes a "0". It should also be noted that mechanical connection 162 from operator button 160 is connected to focus lens 17 and by virtue of this connection moves focus lens 17 along an axis perpendicular to lens 17 so that radiant energy from the object being focused upon, which energy is represented by arrow 240, will be transmitted from lens 17 to lenslets 16 and 18 as shown by arrows 242 and 244. Motion of lens 17 changes the amount of radiation being presented to detectors 11, 12, 13 and 14 shown by arrows 246, 248, 250 and 252 respectively so that the outputs of these detectors change to produce the signals found on curves 2 and 3 of FIG. 1. As will be further described, motion of mechanical connection 162 by the operator's pushing of operator button 160 will continue to move lens 17 until such time as a zero crossover signal is received in the system at which time further motion of the lens will be prevented. It should also be recalled that the initial position of lens 17 is chosen to be closer to the camera than the infinity position so that the various measurements of scene contrast can be made more accurately and before the lens has reached the infinity position. In other words, a default signal will cause the motion of lens 17 to stop either at infinity or preferably the hyperfocal extension whenever a low contrast situation exists.

Returning now again to the lower right hand portion of FIG. 2, a NOT SYNC input terminal 260 is shown connected by a conductor 262 to a junction point 264 which is connected as the other input to AND gate 154. Junction point 264 is connected by a conductor 266 to a junction point 268 which is the other input of AND gate 146. Junction point 268 is connected by a conductor 270 to a junction point 272 which is connected to the input of an AND gate 274 and junction point 272 is connected by a conductor 276 to the input of an AND gate 278. It is seen that the NOT SYNC signal which, as explained above, is a "1" until such time as switch contact 170 has been moved out of contact with terminals 172 and 174 at which time the NOT SYNC signal becomes a "0".

It will be recalled that in a low contrast condition, both of the outputs from amplifiers 104 and 114 will be "1" so that the output of AND gate 134 will be a "1" and the lower input terminal of AND gate 146 will receive a "1" while the lower input terminal of AND gate 154 will receive a "0". Prior to the opening of switch contact 170, the NOT SYNC signal on conductor 262 is a "1" and accordingly, at this time, both inputs to AND gate 146 are "1" while one input to AND gate 158 is a "1" and the other input is a "0". By virtue of this arrangement, the output of AND gate 146 on a conductor 280 will be a "1" while the output of AND gate 154 on a conductor 282 will be a "0". Conductor 280 is connected to the set input of a flip-flop 284 while conductor 282 is connected to the reset input of flip-flop 284. With a "1" signal on conductor 280 and a "0" signal on conductor 282, representative of a low contrast condition, the Q output of flip-flop 284 appearing on a conductor 286 will be a "1". As will be seen, a "1" signal on the Q output of flip-flop 284 appearing on conductor 286 is representative of a low contrast condition and this signal is presented by conductor 286 to one input of an OR gate 288. Whenever a "1" signal exists as an input to OR gate 288, its output on a conductor 290 will be a "1". This output on conductor 290 is connected to the upper input terminal of an AND gate 292, the other input terminal of which is connected by a conductor 294 to a SYNC terminal 296. It will be recalled that the SYNC signal continues to be a "0" until such time as switch contact 170 opens after which time the SYNC signal becomes a "1". It will also be noticed that it does not matter what the other input to OR gate 288 is so long as the "1" signal on conductor 286, indicative of a low contrast condition, exists, the signal on conductor 290 will be a "1". Furthermore, with the SYNC input being a "0" at all times prior to the opening of switch contact 170, the output of AND gate 292 on a conductor 298 will be a "0". Conductor 298 is connected to the set input of a flip-flop 300, the reset input of which is connected by a conductor 302 to a terminal 304 identified as IR. It will also be recalled that prior to the three to six millisecond delay, the IR signal is a "1" and this "1" signal operates to reset flip-flop 300 so as to produce a "1" signal at its NOT Q output on conductor 306. This "1" signal on conductor 306 is presented through a resistor 308 to the base of an NPN transistor 310 having an emitter connected by a conductor 312 to a input terminal 314 indicated as $V_{in}$ and a collector connected to a junction point 316. With a "1" signals to the base of transistor 310, transistor 310 is rendered conductive and the $V_{in}$ signal from terminal 314 is presented to junction point 316. Junction point 316 is connected through a resistor 318 to a ground connection 320 and is connected by a conductor 322 to the base of a second NPN transistor 324 which has an emitter connected by a conductor 326 to a terminal 328 indicated as $V_{in}$ and a collector connected by a conductor 330 to a solenoid 332 whose other terminal is connected to ground at 334. Solenoid 332 has a mechanical connection 336 connected to the mechanical connection 162 and operates upon energization to stop the motion of mechanical connection 162 so as to prevent further movement of lens 17. Accordingly, it is seen that after the IR signal has become a "1", the signal at the NOT Q output of flip-flop 300 will remain a "1" so long as the set input to flip-flop 300 remains a "0" which condition will persist so long as the SYNC input to AND gate 292 remains a "0", that is at all times prior to the opening of switch contact 170.

With the conditions assumed, that is, a low contrast condition producing a "1" signal on conductor 286 to the input of OR gate 288 and a "1" input to the upper terminal of AND gate 292, then, prior to the opening of switch contact 170, the NOT Q output from flip-flop 300 will remain a "1" so that transistor 310 remains on and transistor 324 remains off. Whenever transistor 324 is off, solenoid 332 is inoperable and motion of the operator's button 160 will continue to move lens 17. Assume now that the switch contact 170 opens which condition will occur shortly after the closure of switch contact 164, then a "1" signal appears as the SYNC signal and a "0" signal appears as the NOT SYNC signal. When a "0" signal appears at terminal 260, the upper input terminal to AND gate 154 becomes a "0" but since, during a low contrast condition, the lower input of AND gate 154 is receiving a "0", its output on conductor 282 will not change. A "0" signal on the upper terminal of AND gate 146, will change the output on conductor 280 to a "0" since prior to the opening of switch contact 170 AND gate 146 was receiving two "1" input signals. The output of flip-flop 284 will not change, however, and with a low contrast condition, will continue to be a "1". The output of OR gate 288 will also continue to be a "1"

but after the opening of switch contact 170, the SYNC signal appearing at terminal 296 will become a "1" thus providing AND gate 292 with two "1" inputs and changing its output on conductor 298 to a "1". With it a "1" signal at the set input of flip-flop 300, the NOT Q output of flip-flop 300 will change to a "0" thereby shutting off transistor 310 and allowing the base of transistor 324 to receive the positive signal from ground connection 320 through resistor 318. This turns transistor 324 to an on condition thereby connecting solenoid 382 to the $V_{in}$ input 328 and activating the mechanical connection 336 so as to stop motion of lens 17 at the infinity or hyperfocal position. It is therefore seen that prior to the opening of switch contact 170, a low contrast condition will have no effect on the motion of the lens but as soon as the switch contact 170 is opened, the solenoid 332 is caused to operate and stop the motion of lens 17 at the infinity or hyperfocal position.

If either of the outputs from absolute value circuits 74 or 94 is a "0", representative of the satisfactory contrast condition, then one or both of the inputs to AND gate 134 will be a "0" and the output of AND gate 134 on conductor 140 will likewise be a "0". The lower input to AND gate 146 will therefore be a "0" while the lower input to AND gate 154 will be a "1". Prior to the opening of switch contact 170, the NOT SYNC input to the upper inputs of AND gates 146 and 154 is a "1" so under these circumstances the signal at the reset terminal of flip-flop 284 will be a "1" while the signal to the set terminal will be a "0". This condition sets flip-flop 284 in a condition where its Q output on conductor 286 will be a "0". Subsequent opening of switch contract 170 thereby changing the NOT SYNC signal to a "0" although changing the output of AND gate 154 to a "0" will not change the output of AND gate 146 and thus the output of flip-flop 284 will remain a "0". The "0" signal on conductor 286, representative of a satisfactory contrast condition, is presented to OR gate 288 and it is now seen that the other input to OR gate 288 may operate to change the output of OR gate 288. The other input to OR gate 288 is controlled by the selected auto focus signal and, as will be explained, changes from a "0" to a "1" when the auto focus signal being employed crosses the zero axis. Prior to such crossing, the zero input to OR gate 288 produces a "0" signal on conductor 290 to AND gate 292 and the output of AND gate 292 will therefore be a "0" presented to the set input of flip-flop 300. Recalling that the brief "1" signal at the IR terminal 304 sets flip-flop 300 in a condition where its NOT Q output on conductor 306 is a "1", transistor 310 will be rendered on and transistor 324 will be rendered off. Under these circumstances, solenoid 332 is inoperative and motion by the operator of button 160 will allow lens 17 to move. Such situation will continue until the time that the lower input to OR gate 288 becomes a "1" at which time its output on conductor 290 will become a "1". If at this time the switch contact 170 is opened, the SYNC signal will be a "1" and the output of AND gate 292 will be a "1", the signal to the set input of flip-flop 300 will operate to produce a "0" signal at the NOT Q output thereof thereby turning transistor 310 off, turning transistor 324 on and operating solenoid 332 to stop further motion of lens 17. This condition will occur at the zero crossover point which, as explained in connection with FIG. 1, will be representative of the best focus position.

It is therefore seen that the circuitry so far described allows the operator to move lens 17 from a start position "beyond infinity" towards the infinity position during which time a measurement for satisfactory contrast is made. If insufficient contrast exists, then any continued motion of switch button 160 opens switch contact 170 which action will cause the solenoid 332 to operate to stop motion of lens 17 at the infinity or hyperfocal position but if a satisfactory contrast condition exists, then upon opening of switch contact 170, the lens will be allowed to move until such time as a signal from the auto focus circuitry to be described causes the solenoid to operate and stop further lens motion at the proper focus position.

It will be recalled that the positive input terminal of comparator 108 receives its input signal from the output of the absolute value circuit 74 while the negative input terminal of comparator 108 receives its input signal from the output of absolute value circuit 94. Accordingly, the output of comparator 108 on a conductor 350 connected to junction point 352 will be a "1" whenever the output of absolute value circuit 74, indicative of $|\log a_1/b_1|$, exceeds the output of absolute value circuit 94, indicative of $|\log a_2/b_2|$ and will be a "0" under the opposite conditions where $|\log a_2/b_2|$ exceeds $|\log a_1/b_1|$. Junction point 352 is connected by a conductor 354 to the upper terminal of AND 278, the other input terminal of which is connected to the NOT SYNC input terminal 260. Junction point 352 is also connected by a conductor 356 to an inverter 360 whose output on a conductor 362 is connected to the upper input terminal of AND gate 274 also having a lower input terminal connected to the NOT SYNC signal at terminal 260. The output of AND gate 278 on a conductor 364 is connected to the set input of a flip-flop 366. The output of AND gate 274 on a conductor 368 is connected to the reset input of flip-flop 366. The Q output of flip-flop 366 is connected by a conductor 370 to the lower input terminal of an AND gate 372, the upper input terminal of which is connected to conductor 68 and thus the output of comparator 65 carrying the signal representative of log $a_1/a_2$. The NOT Q output of flip-flop 366 is connected by a conductor 374 to the upper input terminal of an AND gate 376, the lower input terminal of which is connected to conductor 88 and thus the output of comparator 82, producing the signal log $a_2/b_2$. The outputs of AND gates 372 and 376 are connected by conductors 380 and 382 respectively to the input of an OR gate 384 having an output on a conductor 386 connected to a junction point 388. Junction point 388 is connected by a conductor 390 to an inverter 392 having its output on a conductor 394 connected to the upper input terminal of an AND gate 396. The lower input terminal of AND gate 396 is connected by conductor 398 to a junction point 400 which in turn is connected by a conductor 402 to a terminal 404 indicated as a NOT SYNC terminal. Junction point 400 is also connected by a conductor 410 to the lower input terminal of an AND gate 412, the upper input terminal of which is connected by a conductor 414 to a junction point 416 which in turn is connected by a conductor 418 to junction point 388. Junction point 416 is also connected by a conductor 420 to the upper input terminal of an exclusive OR gate 422, the output of which on a conductor 424 is connected to the lower input terminal of OR gate 288. The output of AND gate 412 is connected by a conductor 426 to the set input of a flip-flop 428 and the output of AND gate 396 is connected by a conductor 430 to the reset input of flip-flop 428. The Q output of flip-flop 428 is connected by a conductor 432 to the lower input terminal of exclusive OR gate 422.

In considering the operation of the circuitry just described, it will be assumed that switch contact 164 has closed thereby producing a "0" signal at the $V_{in}$ terminal 192, that three to six milliseconds has elapsed thus producing a "0" signal at the IR terminal 198 and that a satisfactory contrast condition exists thereby producing a "0" signal on conductor 286 and the upper input terminal of OR gate 288.

There are four possible conditions which may be useful to consider in connection with the operation of the auto focus circuit as follows. Condition one is where the absolute value of log $a_1/b_1$ is greater than the absolute value of log $a_2/b_2$ and the value of log $a_1/b_1$ is positive. The second condition is where the absolute of log $a_1/b_1$ is greater than the absolute value of log $a_2/b_2$ and the value of log $a_1/b_1$ is negative. The third condition is where the absolute value of log $a_2/b_2$ is greater than the absolute value of log $a_1/b_1$ and the value of log $a_2/b_2$ is positive. The fourth condition is where the absolute value of log $a_2/b_2$ is greater than the absolute value of log $a_1/b_1$ and the value of log $a_2/b_2$ is negative.

Under condition one, with the SYNC switch contact 170 closed, a "0" signal will appear from the SYNC terminal 296 to the lower input terminal of AND gate 292 and a "1" signal will appear from the NOT SYNC terminals 260 and 404 to the lower input terminals of AND gates 274, 278, 396 and 412 respectively. With the output of absolute value circuit 74 being greater than the output of absolute value circuit 94, the output of comparator 108 on terminal 352 will be a "1" so that the upper terminal of AND gate 278 will receive a "1" while the upper terminal of AND gate 274 will receive a "0". The output of AND gate 278 and thus the set input of flip-flop 366 will be a "1" while the output of AND gate 274 and thus the reset input of flip-flop 366 will be a "0". Under these conditions, the Q output of flip-flop 366 will be a "1" while the NOT Q output of flip-flop 366 will be a "0". Since the NOT Q output of flip-flop 366 is connected as the upper input of AND gate 376, the output of AND gate 376 will be a "0" regardless of the signal appearing on the output of comparator 82 on conductor 88. Thus the output of comparator 82 will have no effect on the auto focus circuitry. On the other hand, since the Q output of flip-flop 366 is a "1", the lower input terminal of AND gate 372 receives a "1" and its output on conductor 380 will change when the signal on conductor 68 from comparator 65 changes from a "1" to a "0" at the time the curve crosses the zero axis. Before the zero crossover point, both inputs to AND gate 372 are "1" thus the output on conductor 380 to the upper input terminal of OR gate 184 is a "1" and the output of OR gate 384 on conductor 386 is a "1". AND gate 412 will therefore have two "1" inputs while AND gate 396 will have a "1" and a "0" input at which time the set input of flip-flop 428 will be a "1" and the reset input will be a "0". The Q output of flip-flop 428 will therefore be a "1" and the exclusive OR gate 422 will have two "1" inputs and thus a "0" output. Since there is satisfactory contrast, OR gate 288 will have two "0" inputs and its output on conductor 290 will be a "0". Since prior to the opening of SYNC switch contact 170, the lower input to AND gate 292 is a "0", its output on conductor 298 and the set input of flip-flop 300 will be a "0". Since the reset input on terminal 304 and conductor 302 is a "0", the NOT Q output on conductor 306 will remain a "1" and accordingly transistor 310 will be rendered conductive and transistor 324 will be rendered nonconductive. Accordingly, solenoid 332 will be inactivated and operation of operator button 160 will continue to move lens 17.

Now assume that the SYNC switch contact 170 opens thereby causing the SYNC output at terminal 228 to become a "1" and the NOT SYNC output on terminal 238 to become a "0" the only effect such operation will be to provide a "0" signal to the lower input terminals of AND gates 274, 278, 396 and 412. Although the output of AND gates 278 and 412 will therefore change to a "0", this will have no effect on the state of flip-flops 366 and 428 and accordingly, the input to exclusive OR gate 422 will not change nor will the input to OR gate 292 and the signal on conductor 290 at the upper input terminal of AND gate 292 will remain a "0". Therefore, even though the lower input terminal of AND gate 292 changes from a "0" to a "1", its output will remain a "0" and the NOT Q output of flip-flop 300 will remain a "1" leaving transistor 310 on, transistor 324 off and solenoid 332 inoperative so that lens 17 may continue to move.

Now assume under condition one that the value of log $a_1/b_1$ crosses the zero axis indicative of the best focus position. When this occurs, the output of comparator 65 on conductor 68 will change to a "0" and now the input to AND gate 372, which was receiving two "1" signals, will now receive a "0" signal thus producing a "0" signal on conductor 380 and OR gate 384 will receive two "0" inputs changing the signal on conductor 386 to a "0". Since both AND gates 396 and 412 were already receiving "0" input signals, the inputs to flip-flop 428 will not change and the "1" output on conductor 432 will remain. Now, however, the signal on conductor 420 connected to the upper input terminal of exclusive OR gate 422 has become a "0" therefore the output of exclusive OR gate 422 on conductor 424 will become a "1" and one of the inputs to OR gate 288 will be a "1" thus producing a "1" signal on conductor 290. At this time, AND gate 292 receives two "1" input signals and accordingly its output on conductor 298 and the set input of flip-flop 300 becomes a "1". Under these conditions, the NOT Q output on conductor 306 becomes a "0" thereby turning transistor 310 off and allowing transistor 324 to turn on. The turning on of transistor 324 actuates solenoid 332 which operates through mechanical connection 336 to stop the lens motion at the proper focal position.

Under condition two, with the SYNC switch contact 170 closed, a SYNC switch signal at terminal 228 will be a "0" and the NOT SYNC signal at terminal 238 will be a "1". Thus the lower input terminal to AND gate 292 will be a "0" while the lower input terminals to AND gates 274, 278, 396 and 412 will be a "1". As with condition one, the output of comparator 108 will be a "1" indicating that the absolute value of log $a_1/b_1$ is greater than the absolute value of log $a_2/b_2$. Accordingly, as with condition one, the Q output of flip-flop 366 will be a "1" and the NOT Q output will be a "0". As explained above, this renders AND gate 376 inoperative but allows AND gate 372 to change output upon a change in signal from comparator 65 when it crosses zero. Under condition two, the output of comparator 65 on conductor 68 will be a "0" indicating that log $a_1/b_1$ is negative. Accordingly, AND gate 372 receives a "0" and a "1" input thus producing a "0" output on conductor 380. OR gate 384 therefore receives two "0" inputs and its output on conductor 386 will be a "0". This condition is opposite to that in condition one where the output of OR gate 384 was a "1" and now under condition two, exclusive OR gate 422 receives a "0" input signal at its upper terminal. However, AND gate 396 now receives two "1" signals so that the reset input to flip-flop 428 becomes a "1" and the Q output from flip-flop 428 becomes a "0". Therefore exclusive OR gate 422 now receives two "0" inputs and its output on conductor 424 will be a "0" as it was in condition one. OR gate 288 receives two "0" inputs and its output on conductor 290 will be a "0" and the output of AND gate 292 and the set input of flip-flop 300 will be a "0". This condition produces the "1" signal from the NOT Q output of flip-flop 300 thereby turning transistor 310 on, transistor 324 off and solenoid 332 is rendered inactive so that lens 17 can continue to move.

When the SYNC switch contact 170 opens, the SYNC signal becomes a "1" and the NOT SYNC signal becomes a "0". Although the lower input terminals of AND gates 274, 278, 396 and 412 are now changed to a "0", this does not change the output of flip-flops 366 and 428 and accordingly, exclusive OR gate 422 continues to receive a "0" signal at both of its inputs thus producing a "0" signal at its output and OR gate 288 having two "0" input signals produces a "0" output so that even though the lower input terminal to AND gate 292 is changed to a "1", its output remains a "0" and the NOT Q output of flip-flop 300 remains a "1" under which conditions the solenoid 332 is off the lenses can continue to move.

Now when the signal representative of log $a_1/b_1$ from comparator 65 on conductor 68 crosses zero to a positive value, the upper input terminal to AND gate 372 becomes a "1". Both inputs to AND gate 372 are "1" and accordingly, its output on conductor 380 is a "1" and the output of OR gate 384 on conductor 386 is a "1" which, although having no affect on flip-flop 428, produces a "1" signal to the upper input terminal of exclusive OR gate 422 which now changes its output to a "1". OR gate 288 will now have a "1" output and AND gate 292 will have two "1" inputs so that its output on conductor 298 and the set input of flip-flop 300 will be a "1". This changes the signal at the NOT Q output on conductor 306 to a "0" thereby turning transistor 310 off, transistor 324 on and activating solenoid 332 so as to stop the motion of lens 17 at the zero crossover point.

Under condition three, with the SYNC switch contact 170 closed, a "0" signal and a "1" NOT SYNC signal are created. A "0" signal will be presented to the lower input terminal of AND gate 292, the "1" signal will be presented to the lower input terminals of AND gates 274, 278, 396 and 412. With the output of absolute value circuit 94 now being greater than the output of absolute value circuit 74, the output of comparator 108 will be a "0" so that the upper terminal of AND gate 278 receives a "0" while the upper terminal of AND gate 274 receives a "1". The output of AND gate 274 will now become a "1" and operate through the reset input of flip-flop 366 to change its output so that the Q output becomes a "0" and the NOT Q output becomes a "1". In the reverse fashion to conditions one and two, AND gate 372 is now rendered inoperative whereas AND gate 376 may change its output when the output of comparator 82 changes state. Since under condition three log $a_2/b_2$ is positive, the signal on conductor 88, the lower input of AND gate 376 is a "1" so that AND gate 376 has two "1" inputs producing a "1" output to OR gate 384 whose output on conductor 386 is therefore a "1". Under these circumstances, AND gate 412 will have two "1" inputs whereas AND gate 396 will have a "1" and a "0" input. The set input to flip-flop 428 will therefore be a "1" while the reset input will be a "0" thus causing the Q output on conductor 432 to be a "1". Under these circumstances, exclusive OR gate 422 receives two "1" inputs and thus produces a "0" output which is presented to OR gate 288. With satisfactory contrast, OR gate 288 therefore receives two "0" inputs thereby producing a "0" output to AND gate 292 which is also receiving a "0" input from SYNC terminal 296 and its output on conductor 298 will be a "0" thereby assuring that the NOT Q output of flip-flop 300 is a "1" turning transistor 310 on and turning transistor 324 off thereby inactivating solenoid 332 and allowing lens 17 to move.

Upon the opening of SYNC switch contact 170, the SYNC signal becomes a "1" and the NOT SYNC signal becomes a "0" which produces a "1" input to the lower input terminal of AND gate 292 and produces a "0" with the lower input terminals of AND gates 274, 278, 396 and 412. Although the output from AND gate 274 and from AND gate 412 will now change from a "1" to a "0", this will not change the output of flip-flops 366 and 428 and AND gate 376 will continue to receive two "1" inputs. OR gate 384 will produce a "1" output and exclusive OR gate 422 will continue to have two "1" inputs and produce a "0" output. OR gate 288 will therefore continue to produce a "0" output as will AND gate 292 and the NOT Q output of flip-flop 300 will continue to be a "1" thereby rendering solenoid 332 inoperative and allowing further motion of lens 17.

Now assume under condition three that the magnitude of log $a_2/b_2$ crosses the zero axis from a positive value to a negative value. When this occurs, the output of comparator 82 on conductor 88 will become a "0" thereby changing the input of AND gate 376 from two "1" signals to a "1" signal and a "0" signal. When this occurs, the output of OR gate 384 will change to a "0" which will provide a "0" signal to the upper input of exclusive OR gate 422 but will not change the state of flip-flop 428 producing a "1" at its Q output. The output of exclusive OR gate 422 will therefore change to a "1" thus providing OR gate 288 with a "1" input signal and changing its output to a "1" and providing AND gate 292 with two "1" input signals. The output of AND gate 292 will therefore change to a "1" thereby changing the set input to flip-flop 300 to a "1" and changing the NOT Q output of flip-flop 300 to a "0". As explained above, this has the effect of actuating solenoid 332 and causing lens 17 to stop at the zero crossover point representative of proper focus condition.

In the final example, condition four, the output of comparator 82 on conductor 88 will become a "0". Prior to the opening of switch contact 170, the SYNC output is a "0" while the NOT SYNC output is a "1" providing the lower input terminal of AND gate 292 with a "0" input signal and the lower input terminals of AND gates 274, 278, 396 and 412 with a "1" input signal. As with condition three, the output of flip-flop 366 will be such as to render AND gate 372 inoperative but to allow AND gate 376 to pass a signal from comparator 82. Under condition four, AND gate 376 is receiving a "1" signal from the NOT Q output of flip-flop 366 and is now receiving a "0" signal at its lower input terminal thus producing a "0" signal at its output. OR gate 384 now receives two "0" input signals and thus produces a "0" output signal on conductor 386 which is presented to the upper input terminal of exclusive OR gate 422.

The signal on conductor 386 and the upper input terminal to AND gate 412 will be a "0" while both inputs to AND gate 396 will be a "1" thus setting flip-flop 428 to produce a "0" signal at its Q output. Exclusive OR gate 422 therefore receives two "0" input signals and produces a "0" output on conductor 424. Since satisfactory contrast exists, OR gate 288 now receives two "0" input signals and produces a "0" output signal to AND gate 292 which also produces a "0" output signal to the set input of flip-flop 300 but does not change the NOT Q output on conductor 306 which remains a "1" thereby rendering solenoid 332 inoperative allowing lens 17 to move.

Upon the opening of SYNC switch contact 170, the SYNC signal becomes a "1" and the NOT SYNC signal becomes a "0" thereby producing a "1" to the lower input terminal of AND gate 292 and a "0" input signal to the lower terminals of AND gates 274, 278, 396 and 412. Again, as in previous examples, this does not change the output of AND gate 278 not does it change the outputs of flip-flops 366 or 428 and solenoid 332 will remain inoperative thus allowing lens 17 to continue moving.

Now assuming that the log of $a_2/b_2$ crosses zero from minus to positive, the output of comparator 82 on conductor 88 will change to a "1" and now both inputs to AND gate 376 are "1" thereby causing the output on conductor 382 to be a "1" and changing the output of OR gate 384 to a "1". While this change does not change the output of flip-flop 428 which remains a "0", the upper input terminal to exclusive OR gate 422 now becomes a "1" thereby changing the signal on conductor 424 to a "1" and the lower input terminal to OR gate 288 to a "1". The output of OR gate 288 now becomes a "1" and since the SYNC signal is now a "1", both inputs to AND gate 292 become "1" and its output on conductor 298 becomes a "1". The set input to flip-flop 300 is now a "1" which changes the NOT Q output on conductor 306 to a "0" thereby turning transistor 310 off, rendering transistor 324 conductive and energizing solenoid 332 so as to stop motion of lens 17 at the zero crossover point near the position of proper focus.

It is thus seen that I have provided circuitry for use in a low cost auto focus system for comparing the slope of a signal generated by a first two radiation responsive detectors with the slope of a signal generated by a second two radiation detectors and for allowing only the signal which has the largest slope to control the stopping of the lens at the proper focus position. Many changes to the circuitry described in connection with the preferred embodiment will occur to those skilled in the art and I do not wish to be limited to the specific disclosures contained herein. For example, two detector pairs have been shown in the preferred embodiment but the invention would be equally useful with other numbers of detector pairs, such as three in which additional comparisons would be made to select the signal having the largest slope. I therefore intend only to be limited by the following claims.

The embodiments of the invention in which an exclusive property or right is claimed are defined as follows:

1. Apparatus for use in a range finding system comprising:
   first and second pairs of radiation responsive detectors operable to produce output signals $a_1$, $b_1$, $a_2$ and $b_2$ respectively indicative of the radiation each detector receives from a remote object;
   first means connected to said radiation detectors to receive the output signals and operable to produce a first comparison signal indicative of the slope of a line generated by the values of $a_1$ and $b_1$ and a second comparison signal indicative of the slope of a line generated by the values of $a_2$ and $b_2$; and
   signal steering means connected to said first means and operable to compare the magnitudes of the first and second comparison signals and to transmit the first comparison signal whenever the first comparison signal has a greater slope than the second comparison signal and to transmit the second comparison signal whenever the second comparison signal has a greater slope than the first comparison signal.

2. Apparatus according to claim 1 wherein the first comparison signal is a function of log $a_1/b_1$ and the second comparison signal is a function of log $a_2/b_2$.

3. Apparatus according to claim 1 wherein the signal steering means includes first absolute value means connected to said first means to receive the first signal to produce a first absolute value signal indicative of the absolute value of the first and includes second absolute value means connected to said first means to receive a second signal and to produce a second absolute value signal indicative of the absolute value of the second signal and further includes means to compare the first and second absolute value signals to determine which is greater for purposes of producing the transmitted signal.

4. Apparatus according to claim 1 further including means connected to said signal steering means and operable to produce a resultant signal indicative of the range to the remote object when the transmitted signal reaches a predetermined value.

5. Range determining apparatus comprising:
   lens means; motive means connected to move said lens means to a proper focus position with respect to a remote object, the proper focus position being indicative of the range to the remote object;
   first and second radiation responsive detectors mounted to receive radiation from the remote object through said lens means and operable to produce output signals $a_1$ and $b_1$ indicative of the radiation received thereby, $a_1$ being substantially equal to $b_1$ when said lens means is proximate the proper focus position;
   third and fourth radiation responsive detectors mounted to receive radiation from the remote object through said lens means and operable to produce output signals $a_2$ and $b_2$ indicative of the radiation received thereby, $a_2$ being substantially equal to $b_2$ when said lens means is proximate the proper focus position;
   first signal combining means connected to said first and second radiation responsive detectors to receive the output signals and to produce a first combined signal generated by a combination of $a_1$ and $b_1$ as said lens means moves, said first combined signal having a first slope and having a predetermined value when $a_1$ and $b_1$ are substantially equal;
   second signal combining means connected to said third and fourth radiation responsive detectors to receive the output signals and to produce a second combined signal generated by a combination of $a_2$ and $b_2$ as said lens means moves, said second combined signal having a second slope and having a predetermined value when $a_2$ and $b_2$ are substantially equal;

comparing means connected to said first and second signal combining means to receive the first and second combined signals and to compare the magnitude of the first slope with the magnitude of the second slope, said comparing means operable to transmit to an output the combined signal having the greatest slope; and resultant means connected to the output of said comparing means to receive the signal having the greatest slope and operable to produce a resultant signal when the signal having the greatest slope reaches the predetermined value.

6. Apparatus according to claim 5 wherein the first combined signal is a function of log $a_1/b_1$, the second combined signal is a function of log $a_2/b_2$ and the predetermined value is substantially zero.

7. Apparatus according to claim 5 wherein said comparing means includes first absolute value means for producing a first absolute value signal indicative of the absolute value of the first combined signal, second absolute value means for producing a second absolute value signal indicative of the absolute value of the second combined signal and a comparator to determine the greatest of the first and second absolute value signals when said lens means is in a predetermined position.

8. Apparatus according to claim 5 further including stopping means connected to said resultant means and to said motive means and operable to stop said lens means upon receipt of the resultant signal.

9. Apparatus according to claim 5 further including reference means connected to said first and second signal combining means and operable to produce a default signal when neither the first nor the second combined signal has a slope greater than a predetermined slope; and means connecting the reference means to said resultant means so that said resultant means produces a resultant signal upon receipt of the default signal.

10. Apparatus according to claim 9 further including stopping means connected to said resultant means and to said motive means and operable to stop said lens means upon receipt of the resultant signal.

11. Apparatus for use with an auto focus system that includes first means producing a first signal that is a function of log $a_1/b_1$ and second means producing a second signal that is a function of log $a_2/b_2$ where $a_1$, $b_1$, $a_2$ and $b_2$ are outputs from two pair of radiation detectors mounted to receive radiation through focus lens means from a scene containing an object to be focused upon, the system including motive means to move the focus lens means from a first position through a proper focus position to a second position, the first and second signals having magnitudes which change with respect to a reference value as the focus lens means is moved from the first to the second position and having a zero magnitude when the lens means is proximate the proper focus position;

first absolute value means connected to receive the first signal and operable to produce a first output signal which is a function of the absolute magnitude of the first signal;

second absolute value means connected to receive the second signal and operable to produce a second output signal which is a function of the absolute magnitude of the second signal;

comparing means connected to said first and second absolute value means to compare the magnitudes of the first and second output signals and operable to produce a resultant signal having a first characteristic when the absolute magnitude of the first signal is greater than the absolute magnitude of the second signal and having a second characteristic when the absolute magnitude of the second signal is greater than the absolute magnitude of the first signal; and signal processing means connected to the first and second means to receive the first and second signals, connected to said comparing means to receive the resultant signal and having an output connected to the motive means, said signal processing means operable when the resultant signal has the first characteristic to connect the first means to the motive means to stop the moving of the lens means when the first signal has a zero magnitude and operable when the resultant signal has the second characteristic to connect the second means to the motive means to stop the moving of the lens means when the second signal has a zero magnitude.

12. Apparatus according to claim 11 further including reference means connected to the first and second absolute value means to receive the first and second absolute value means to receive the first and second output signals and to produce a default signal when neither the first nor the second output signal has a value greater than a predetermined reference value when the focus lens means is proximate the first position; and means connecting said reference means to said signal processing means so that said signal processing means stop the motive means proximate the first position upon receipt of a default signal.

* * * * *